July 2, 1935.  E. R. EVANS  2,006,633
CONSTRUCTION FOR VEHICLE BRAKES
Original Filed Oct. 7, 1929   2 Sheets-Sheet 2
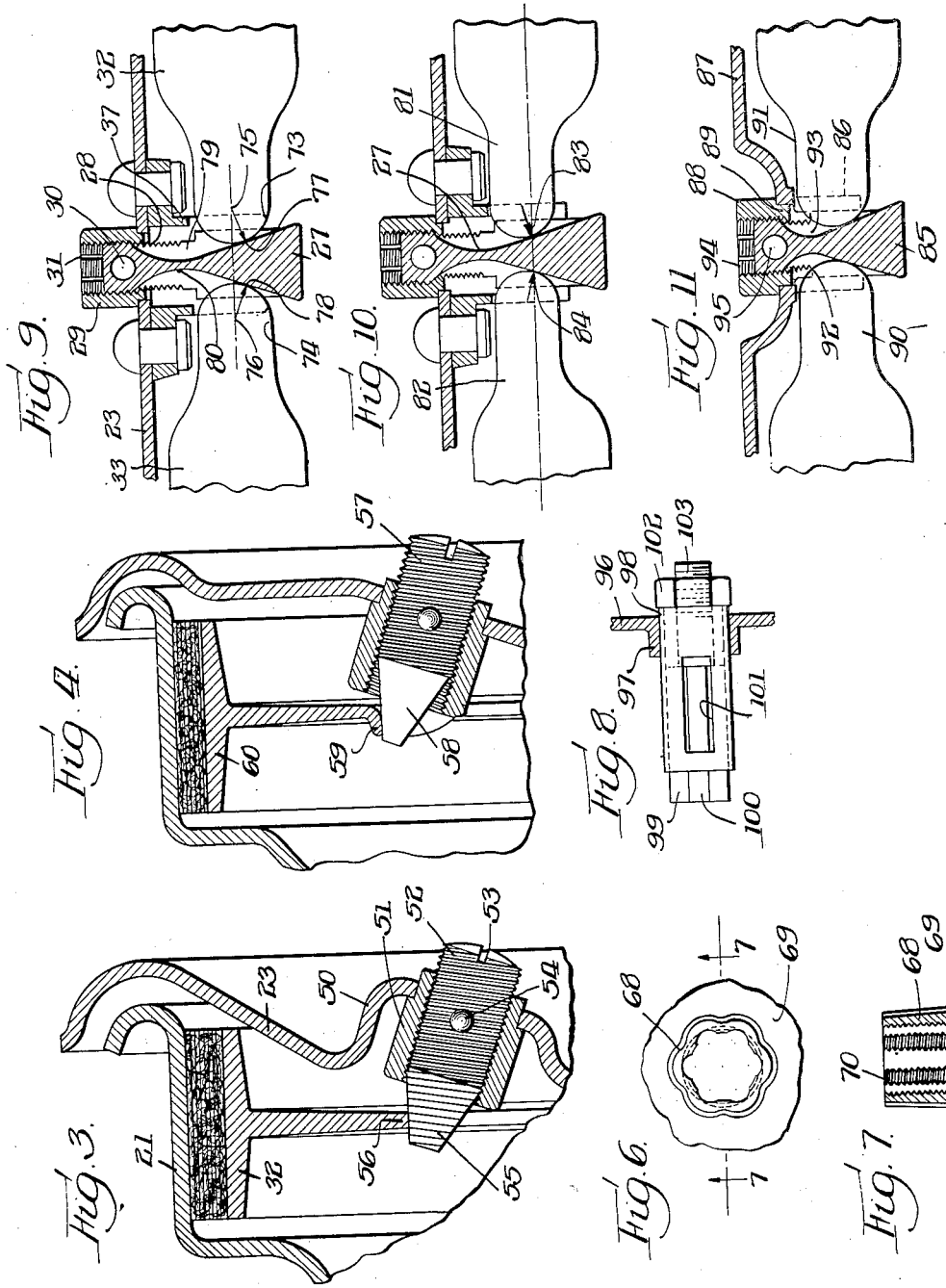
Inventor:
Edwin R. Evans, Patented July 2, 1935

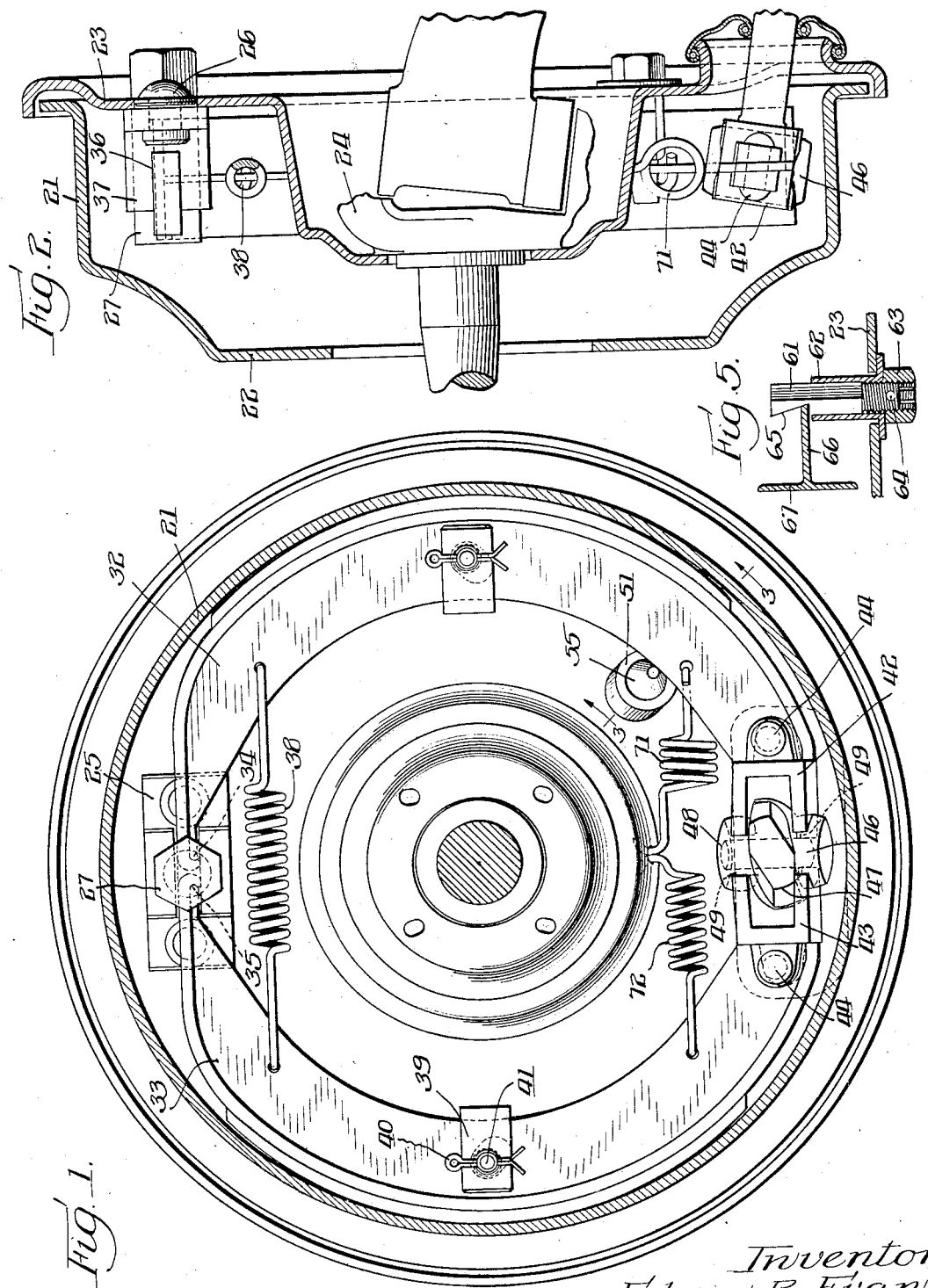

2,006,633

UNITED STATES PATENT OFFICE 2,006,633

CONSTRUCTION FOR VEHICLE BRAKES

Edwin R. Evans, Chicago, Ill.

Original application October 7, 1929, Serial No. 397,996. Divided and this application January 27, 1933, Serial No. 653,767

5 Claims. (Cl. 188—78)

This invention relates to a new and improved construction for vehicle brakes, and more particularly to the construction of the brake parts carried upon or adjacent the vehicle wheels.

My invention relates to brake constructions of the type comprising a brake drum with means pivoted within the drum and adapted to be expanded into engagement with the inner surface of the drum for braking purposes.

This application is a division of my application Serial No. 397,996 filed October 7, 1929.

It is an object of the present invention to provide a new and improved brake for vehicles.

It is also an object to provide an improved pivot construction including means whereby the brake means may be adjusted and may have a reduced contact with the pivot means.

It is an additional object to provide a construction whereby the brake shoes may have substantially a point contact with the pivot and whereby such contact may be located upon the center line of the shoes.

Other and further objects will appear as the description proceeds.

I have shown certain preferred embodiments of my invention in the accompanying drawings, in which—

Figure 1 is a side elevation of one form of the construction showing it applied to a brake drum;

Figure 2 is a vertical section taken through the construction of Figure 1;

Figure 3 is a fragmentary section taken on line 3—3 of Figure 1;

Figure 4 is a fragmentary section similar to Figure 3 but showing a modified form of construction;

Figure 5 is a view similar to Figure 3 showing a further modified form of centralizer construction;

Figure 6 is a fragmentary plan view of a further modified form of support for a centralizer;

Figure 7 is a section taken on line 7—7 of Figure 6;

Figure 8 is a fragmentary section showing the pivot construction;

Figure 9 is a fragmentary section showing the pivot construction and associated brake shoes; and Figures 10 and 11 are views similar to Figure 9, but showing modified forms of construction.

Referring first to Figures 1 and 2, the brake drum 21 is provided with an inturned flange 22 by which it may be suitably connected to the vehicle wheel. The back plate 23 is supported on a steering knuckle 24 and carries the brake mechanism. The bearing bracket 25 is secured to the plate 23 by means of rivets 26 and is provided with an hexagonal opening through which passes the pivot member 27. This pivot member, as best shown in Figure 9, is provided with a reduced threaded portion 28 upon which is threaded a nut 29 having a bearing in an opening in the back plate 23. The pivot member 27 is provided with a spring-pressed ball 30 carried in a bore drilled into the member, this ball being adapted to coact with grooves 31 broached or otherwise formed in the inner face of the nut 29. This is for the purpose of determining the extent of adjusting movement after the shoes have been brought to bear against the brake drum by withdrawal of the member 27.

The brake shoes 32 and 33 are provided with rounded ends 34 and 35 which fit into recesses machined in the sides of the pivot member 27. These ends are rounded in a plane extending transversely or across the outer face of the brake shoe and are rounded so that the convex surface is toward the pivot member. These ends of the shoes pass through slots 36 formed in the side of the bracket extension 37. The brake shoes are connected adjacent the pivot point by the cross spring 38, which retains the ends of the shoes in engagement with the pivot. Anti-rattler springs 39 are provided, fitted about the flanges of the brake shoes and retained in place by cotter pins 40 passing through the supporting lugs 41 which are secured to the back plate 23. The lower ends of the brake shoes 32 and 33 are provided with the bearing plates 42 and 43. These bearing plates are shown as secured to the brake shoes by the rivets 44 and 45.

The brake operating cam 46 is provided with barrel-shaped upper and lower portions fitting against rounded portions formed in the adjacent edges of the bearing plates 42 and 43. The central portion of the cam member 46 is provided with extensions 47 which serve to support the cam member between the bearing plates when in either the normal or the operating position, by bearing against the inner surfaces of the inwardly extending arms of the bearing plates 42 and 43. The cam member 46 is provided with the centrally located opening 48 which is drilled lengthwise of the cam. This opening is preferably filled with a wick, or other lubricant holding substance, such as felt or the like, and radial openings 49 are drilled through the barrel-shaped surfaces of the cam into the central bore 48. Additional wicks may be provided in the openings 49. This arrangement serves to lubricate the surfaces which are in contact with the rounded surfaces of the wear plates and thus serves to both minimize wear and to reduce squeaks or noises.

The shoes 32 and 33 have the bearing plates, 42 and 43 held against the cam 46 by means of the springs 71 and 72, which have their adjacent ends hooked into the back plate 23. In the form of construction shown, the spring 71 on the wrapping or self-energizing shoe 32 is stronger than the spring 72 on the unwrapping shoe 33. By this means the braking effect of the two shoes may be equalized to a desired extent and also a rapid release of the wrapping shoe assured.

The centralizer construction of Figure 2 is shown in greater detail in Figure 3. Here the back plate 23 is provided with the recessed portion 50 into which is welded the tubular member 51 having a threaded interior to receive the threaded centralizer member 52. This member 52 is shown as provided with the transverse slot 53 by means of which it may be rotated by the use of a screwdriver or the like. The threads of the member 51 are provided with longitudinal scorings or grooves to cooperate with the spring-pressed ball 54 for purposes of indicating the amount of adjustment. The conical end 55 of the centralizer 52 bears against the inner edge 56 of the flange of the brake shoe 32. The conical end 55 is threaded at a pitch similar to that of the threads of the body portion of the centralizer so that there is no lateral thrust upon the edge of the flange of the brake shoe as the centralizer is threaded inwardly to force the brake shoe outwardly into engagement with the brake drum 21.

A modified form of construction is shown in Figure 4, where the centralizer 57 is provided with the smooth conical surface 58 which engages an upturned lip 59 on the flange of the brake shoe 60. This smooth surface 58 and the broad engagement on the lip 59 serve to reduce any tendency to thrust the brake shoe laterally as the centralizer 57 is threaded inwardly. It will be noticed also that the angle of the conical face 58 is such, and the axis of the cone is so placed, that the surface engages the brake shoe in a plane normal to that of the adjusting movement of the shoe. This serves to further reduce any lateral thrust during the adjustment. With the form of construction of Figure 3 it is unnecessary to thus coordinate the angle at which the centralizer is placed and the angle of the conical end, since the threads on the conical end will prevent lateral thrust and the angles may vary from those shown.

The form of centralizer shown in Fig. 5 consists of a hexagonal member 61 which is fitted through a hexagonal sleeve 62 carried by the back member 23. This member 61 is adjusted into and out of the sleeve 62 by means of the nut 63 and the adjustment is indicated by the spring-pressed ball 64, as previously described in connection with the other forms. The hexagonal member 61 is provided with the inwardly inclined surface 65 which engages the inner edge of the flange 66 of the brake shoe 67. It will be apparent that an outward movement of the member 61 will serve to thrust the brake shoe outwardly into engagement with the brake drum. Lateral movement of the brake shoe is limited by the sleeve 62 which would engage the flange 66 and stop movement in this direction.

The form of integral sleeve 68 pressed inwardly from a back plate 69, as shown in Figures 6 and 7, may be substituted for the sleeves of Figures 3, 4 and 5 when it is desired to make a more simple and unitary structure. It will be noted from the plan view of Figure 6 and section of Figure 7, that the thread 70 on the interior of the sleeve 68 is interrupted to form longitudinally extending recesses which would coact with the spring-pressed ball contained in the centralizer to be threaded into the sleeve 68.

In Figure 9, the brake shoes 32 and 33 are provided with the reduced rounded ends 73 and 74. These ends are rounded on a circular arc struck from the points 75 and 76 as centers. These centers are located on the median line of the two brake shoes. It will be noted that the points of contact 77 and 78 with the bases of the slots 79 and 80 formed in the pivot member 27, are not located on the median line of the shoes due to the angularity of the base of the slot. It is desirable to have a point contact between the brake shoes and pivot to minimize wear and render the operation more easy and to allow self-alignment of the shoes.

It may be considered desirable also to have the point of contact located normally on the median line of the shoes, in which case the form of construction shown in Figure 10 may be used, where the extensions 81 and 82 formed on the brake shoes are not located on exactly the median line of the shoes, but are so located that the points of contact 83 and 84 between the rounded ends of the shoes and the bases of the grooves in the member 27 are located on the median line of the shoes. While this construction has the advantage of so locating the contact point, it has the disadvantage that it will be necessary to provide right and left brake shoes, as one form of shoe will not serve upon both sides of the pivot.

The form of construction shown in Figure 11 differs from that shown in Figure 9 in that the pivot member 85 is carried in an integral tubular extension 86 formed on the back plate 87. The nut 88 threaded on the member 85 has a reduced portion 89 bearing against the shoulder forming the edge of the tubular portion 86. The member 85 may be circular in cross section since it will be prevented from rotating by the engagement of the end portions 90 and 91 of the brake shoes in the slots 92 and 93 formed in the member 85. These extended portions 90 and 91 pass through slots formed in the tubular extension 86 and are thus prevented from displacement radially of the wheel. The nut 88 is provided with the grooves 94 adapted to coact with the spring-pressed ball carried in the bore 95.

The form of construction of the pivot shown in Figure 8 differs somewhat from that shown in the figures just described, in that the back plate 96 has an inturned flange 97 formed therein into which is rigidly secured a tubular member 98 which is shown as circular in cross section, although it may be hexagonal in cross section or formed of a greater or less number of sides. The sleeve 98 is held against rotation by being secured to the inturned flange 97. The pivot member 99 fits into the sleeve 98 and is provided with the slots 100 which are adapted to be located inwardly of the lateral openings 101 in the sleeve 98, which serve to admit the ends of the brake shoes. The nut 102 is threaded onto the reduced threaded extension 103 of the pivot member 99 and serves to move that member inwardly or outwardly of the sleeve 98.

In the use of the centralizers shown in Figures 1 to 4, it will be understood that the adjustment is had by first threading the centralizer in until the shoe is forced into engagement with the drum. The centralizer is then backed out until the desired clearance is secured. With a known pitch of the thread and a known number of clicks of the spring-pressed ball for each revolution of the centralizer, any desired clearance may be had by counting the clicks. The spring-pressed balls also serve as detents to prevent loss of adjustment after it has been secured.

The pivot adjustment is made in the same manner. The pivot member is drawn out until the shoes are forced against the drum and the pivot is then moved in a number of clicks to give the desired clearance. The detents are preferably similarly spaced on the centralizer and the pivot adjustment and the threads are the same or else the spacing and threads are so related that the distances between detents on both centralizer and pivot represent the same amount of adjustment of the shoes.

While I have shown certain preferred embodiments of my invention by way of illustration, it is capable of further changes and modifications to meet varying conditions, and I contemplate such changes and modifications as come within the spirit and scope of the appended claims.

I claim:

1. In a brake construction, a brake pivot having shoe engaging surfaces thereon, a brake shoe having a convexly rounded end portion engaging a surface on the pivot, the contact surface on the shoe end being convex toward the surface on the pivot, the end portion being rounded in a plane extending transversely of the brake shoe.

2. In a brake construction, a brake pivot having inclined shoe engaging surfaces thereon, and a brake shoe having a rounded end portion engaging a surface on the pivot, the end portion being rounded in the plane of the engaging surfaces and making substantially a point contact with the surface.

3. In a brake construction, a brake pivot having inclined shoe engaging surfaces thereon, and a brake shoe having a rounded end portion engaging a surface on the pivot, the end portion being rounded in the plane of the engaging surfaces and making substantially a point contact with the surface, the contact being located substantially in the median plane of the shoe.

4. In a brake construction, an adjustable pivot having an inclined shoe engaging surface, and a shoe having a convexly rounded surface engaging said surface, the surface being rounded convexly toward the pivot surface on a circular arc in a plane extending transversely of the brake shoe.

5. In a brake construction, an adjustable pivot having an inclined shoe engaging surface, and a shoe having a rounded surface engaging said surface, the surface being rounded on a circular arc in the plane of the shoe engaging surface, the center of the arc being laterally offset whereby the point of engagement is located substantially upon the median plane of the shoe.

EDWIN R. EVANS.